(12) United States Patent
Armour et al.

(10) Patent No.: US 7,904,460 B2
(45) Date of Patent: Mar. 8, 2011

(54) DETERMINING COMPUTER INFORMATION FROM PROCESSOR PROPERTIES

(75) Inventors: David J. Armour, Bellevue, WA (US); Jagadeesh Kalki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/107,848

(22) Filed: Apr. 23, 2008

(65) Prior Publication Data

US 2009/0271437 A1 Oct. 29, 2009

(51) Int. Cl.
 *G06F 17/30* (2006.01)
(52) U.S. Cl. ......... 707/747; 707/722; 707/695; 707/688; 707/689
(58) Field of Classification Search ............ 707/747
 See application file for complete search history.

(56) References Cited

U.S. PATENT DOCUMENTS

| | | | |
|---|---|---|---|
| 5,790,834 A * | 8/1998 | Dreyer et al. | 703/22 |
| 5,809,287 A | 9/1998 | Stupek, Jr. | |
| 5,884,091 A | 3/1999 | Ghori | |
| 5,940,607 A | 8/1999 | Hwang | |
| 5,958,037 A * | 9/1999 | Dreyer et al. | 712/32 |
| 6,161,177 A | 12/2000 | Anderson | |
| 6,516,429 B1 | 2/2003 | Bossen | |
| 6,571,339 B1 | 5/2003 | Danneels | |
| 7,117,355 B2 | 10/2006 | Zomaya | |
| 2002/0116445 A1 * | 8/2002 | Huh | 709/202 |
| 2002/0178410 A1 * | 11/2002 | Haitsma et al. | 714/709 |
| 2004/0148420 A1 * | 7/2004 | Hinshaw et al. | 709/231 |
| 2004/0181670 A1 * | 9/2004 | Thune et al. | 713/176 |
| 2004/0205110 A1 * | 10/2004 | Hinshaw | 709/201 |
| 2004/0221170 A1 * | 11/2004 | Colvin | 713/193 |
| 2005/0108219 A1 * | 5/2005 | De La Huerga | 707/3 |
| 2006/0070125 A1 * | 3/2006 | Pritchard et al. | 726/18 |
| 2006/0265698 A1 * | 11/2006 | Kamen et al. | 717/141 |
| 2009/0265783 A1 * | 10/2009 | Huynh et al. | 726/22 |
| 2010/0017777 A1 * | 1/2010 | Zeidman et al. | 716/18 |

OTHER PUBLICATIONS

J. Steunebrink, "SPU Upgrade: How to Easily Check Your CPU Vendor, Model, Internal Speed, and L1 cache mode settings", Aug. 8, 2007, web.archive.org/web/20071209213241/web.inter.nl.net/hcc/J.Steunebrink/chkcpu.htm.*
WMI Tasks: Computer Hardware, http://msdn2.microsoft.com/en-us/library/aa/394587(printer).aspx, 2008, 5 pages.
CPU-Z, Identify Your CPU and System Details, http://www.snapfiles.com/reviews/CPU-Z/cpuz/html, retrieved Feb. 19, 2008, 1 page.
Steunebrink, Jan, CPU Upgrade: How to easily check your CPU Vendor, Model, Internal speed, and L1 cache mode settings, "CPU Identification utility", Aug. 8, 2008, 6 pages.
CPU Informer, "SourceFoge.net", http://sourceforge.net/projects/cpuinformeri, retrieved Feb. 19, 2008, 2 pages.

* cited by examiner

*Primary Examiner* — Charles Kim
*Assistant Examiner* — Sheryl Holland

(57) ABSTRACT

Described is a technology by which directly ascertainable properties of a processor are collected, and used as a key to access other information about the processor, such as age-related information maintained in a separate lookup table. If a matching entry is not found, the property information may be added to an unknown list and/or used to dynamically update the lookup table. A data structure such as a record comprises a set of fields including fields containing data representative of properties of a processor, a key value determined from the data in at least some of the fields and an identifier that identifies the processor relative to other processors of other computing devices. The fields may include manufacturer data, brand identifier data, cache information, normalized processor speed data, mobile chip information and/or CPU model data.

15 Claims, 3 Drawing Sheets

DETERMINING COMPUTER INFORMATION FROM PROCESSOR PROPERTIES

BACKGROUND

In an enterprise such as a large business, administrators/asset managers need to inventory their computer systems for various reasons. However, computer processors do not provide all the information that may be important to know about them. For example, knowing the age of each computer is needed for asset reporting, for depreciation purposes, and for replacing older machines. Computer age also may be important for support, lease contracts, and warranties.

The age of a computer system's central processing unit (CPU, or simply "processor" herein) is a reasonably appropriate way to determine a computer system's age, because the processor is rarely changed. However, there is no age information provided by a processor. Similarly, processors do not provide other information that an organization may like to know about its computer systems, such as operating system compatibility.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which ascertainable properties of a processor are collected, and used to access other information about the processor, such as age-related information. In one aspect, the properties are hashed into a key for use in accessing a lookup table that contains the other information. The key and/or other information may become part of the property set, such as in other fields of a record, and the record may be associated with that particular processor via an identifier field.

In one aspect, if the key used for accessing the lookup table does not find a matching entry, the property information may be added to an unknown list. If the processor is deemed likely a new processor when the key does not have an entry in the table, the lookup table may be dynamically updated with a new entry corresponding to this key.

In one example implementation, a data structure comprises a set of fields including fields containing data representative of properties of a processor, a key value determined from the data in at least some of the fields and an identifier that identifies the processor relative to other processors of other computing devices. The key value is used as a key to another data structure to access information about the processor (e.g., a creation date) that is not directly listed among the properties. The fields may include data related to a manufacturer of the processor, data related to a brand identifier for the processor, data related to processor cache information, data related to normalized processor speed data, data related to mobile chip information and/or data related to a name of the CPU model.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using a processor's ascertainable properties to identify that processor relative to other types of processors. Then, once the processor identity is established, the identity may be used to determine information about the processor, such as the approximate age of the processor, e.g., by using a lookup table of processor creation dates. Other information such as or operating system compatibility may be accessed, e.g., by using a compatibility lookup table entry and/or possible other data. Further, the table or tables may be updated as newly developed processors are detected.

While the various examples herein are directed towards a particular set of properties associated with a processor, and the use of those properties in determining a processor's age, is understood that these are only examples. Additional properties, including those not yet defined, may be used to identify a processor relative to other types of processors. Further, it is understood that not all of the properties are necessary to identify a processor, e.g., some property data may be helpful, but not necessary in differentiating processors. Still further, determining age is only one use of the properties; other possible uses include identifying computer systems having a recalled processor, determining whether a processor is compatible with an operating system, licensing software based on the processor's number of cores, and so forth.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
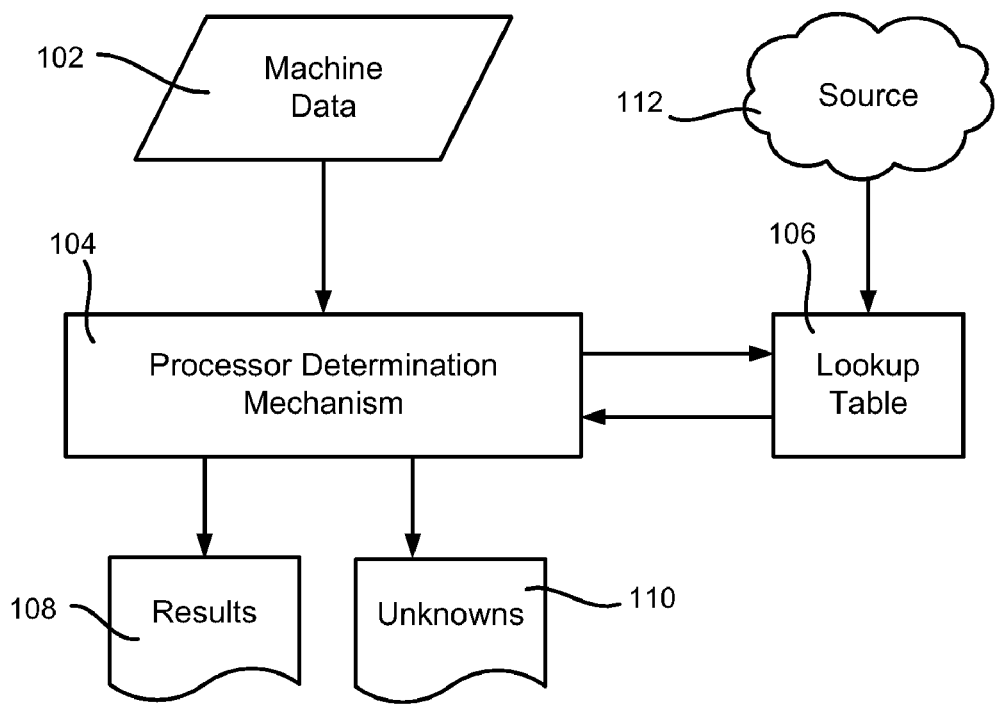
FIG. 1 is a block diagram representing example components related to determining data related to a processor based upon ascertainable properties of the processor.

Turning to FIG. 1, identifying the processor in a given computer system is an initial step in determining the age of that computer system. Computer manufacturers provide standard APIs via WMI (Windows Management Instrumentation), assembly language Instructions and other means (e.g., BIOS) to collect properties about the processor. This is represented in FIG. 1 via the machine data 102.

In one example implementation, for purposes of identifying a processor, a processor determination mechanism 104 collects and/or computes the following fields based on the machine data 102:

| Property | Description |
|---|---|
| Manufacturer | The manufacturer of the CPU |
| BrandID | The brand id for the CPU |
| PCache | The Pcache for the CPU |
| NormSpeed | The normalized processor speed |
| IsMobile | Determination of whether the CPU is a mobile |

-continued

| Property | Description |
|---|---|
| | chip or not |
| Name | The market name of the CPU model |
| CPUHash | A hash of the properties above |
| SMSGUID | A unique identifier for the computer in which the CPU is installed |

This data may be collected on an individual machine, or as an inventory process by communicating with every accessible computing device in an organization. Each machine may be queried, and/or may contain an agent that collects the data, e.g., the processor determination mechanism 104 may be a remote server/service, and/or may contain a local component with respect to the computer system being queried.

The result of the data collection operation comprises a set of records for the one or more computers that were queried, each computer uniquely identified relative to one another (e.g., at least in the environment, but typically by the GUID in the SMSGUID property field). This set of records is further processed to obtain information about the computer system, e.g., to determine the creation date of the processor.

Note that with respect to the processor speed property, because otherwise very similar processors may vary only in clock speed, some normalization may be performed. For example, rather than have a number of different types of processors that otherwise vary by a few hundred megahertz at most, ranges of speeds may be used, e.g., a 3.0 GHz processor and a 3.2 GHz processor may be considered as having the same speed and assigned the same normalized speed value. As will be understood, this reduces the number of possible combinations of the properties. Other possible processing may include converting text data to codes or the like, normalizing other fields when processor types are known to be similar to one another and a property varies only insignificantly, and so forth.

In one example implementation, the creation date for each processor in the set is determined by accessing a data structure in the form of lookup table 106. In this example, the table 106 is keyed (indexed) by the combined (hashed) properties to provide the creation date. Each inventoried processor properties hash (CPUHash), along with its unique machine ID for example, is joined with the lookup table 106 to determine the creation date of the processor and thereby reasonably estimate the probable age of the computer.

If a hash cannot be joined to the lookup table 106, the record can be persisted to some other unknown set 110. For example, if a corresponding entry is not found, the record can be sent to a service for further investigation.

The results 108 may be output in some way, such as in the form of a report for use by an administrator. Such a report may be filtered, grouped and/or sorted as desired, and its data may be used by an automated process in some way. For example, one set of reports allows an organization administrator to view a summary of their computers (all or some subset) by age, such as organized by year and quarter. The administrator can further evaluate the records of individual computers for more information.

In general, the lookup table 106 may be built and/or maintained in a number of ways. For example, the creation dates may be obtained by working with known data, such as from processor manufacturers and/or researchers who investigate record in the unknown set 110. This is represented in FIG. 1 by the source 112. On occasion, an updated lookup table containing newly-identified data (e.g., creation dates) may be provided. For example, such an update may come in the form of a periodic download or an ongoing synchronization.

As mentioned above and as generally represented in FIG. 2, other data 222 may be accessed via the properties 202. For example, in addition to or instead of age-related data, information such as whether a processor has been recalled, whether a processor is compatible with an operating system version, whether a processor can be over-clocked and so forth may be maintained in an extended table 206 (or in separate tables). The processor determination mechanism 104 may receive all such data when it sends a key 222 and select that which is desired, or may provide a parameter or the like indicating which type of data is to be returned. Note that the returned data 220 may be combined with other ascertainable data, e.g., operating system compatibility may depend on both a suitable processor and sufficient system memory; the amount of memory may be separately obtained.

Figure 3:
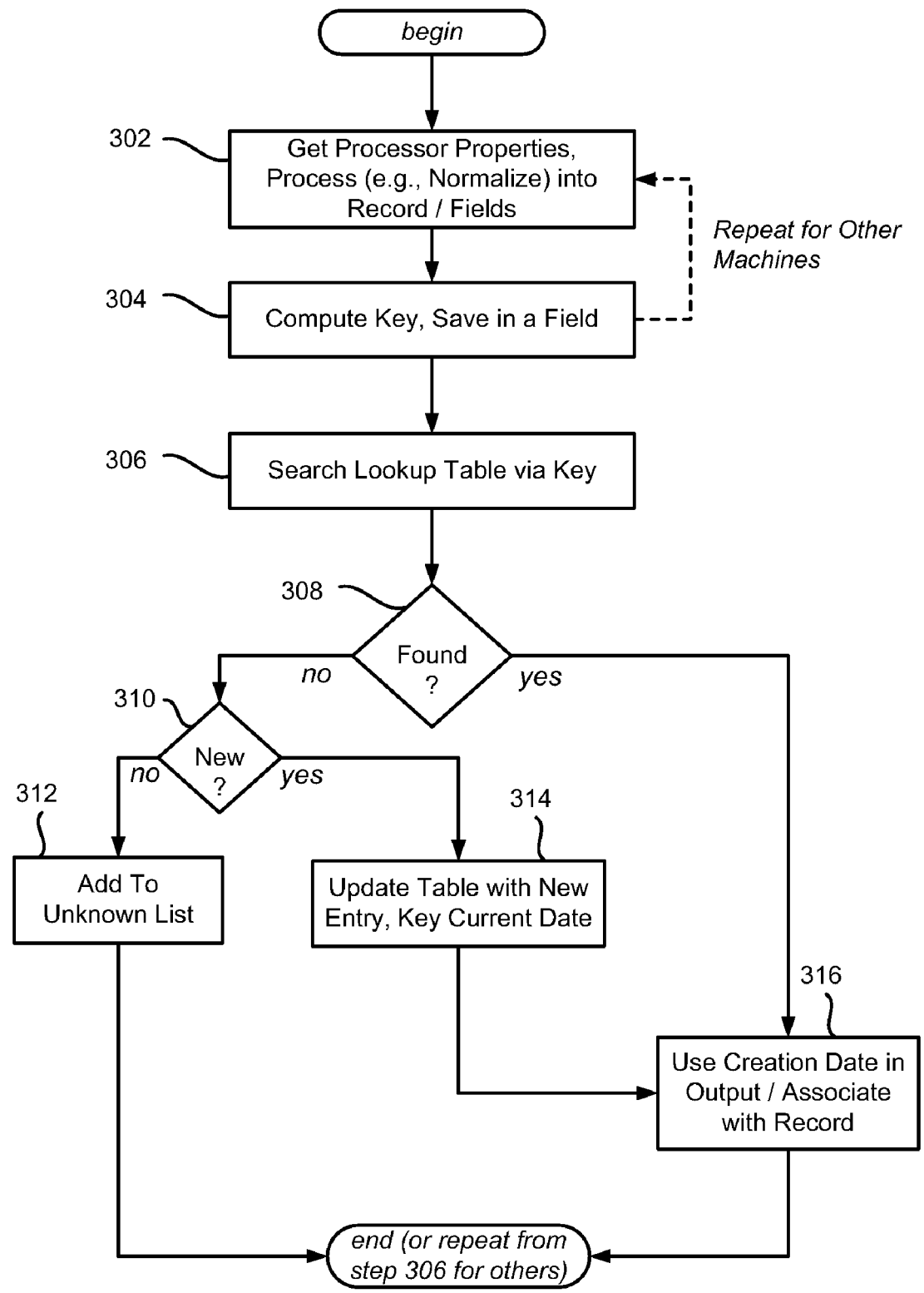
FIG. 3 is a flow diagram representing example steps taken to determine a processor's creation date.

Turning to an explanation of the general operation, FIG. 3 is a flow diagram showing example steps that may be taken to obtain age-related information for a processor based upon its ascertainable properties. Step 302 represents collecting the properties, and processing them as appropriate (e.g., normalizing its speed) to build a record. An identifier assigned to this machine is associated with the record, such as in a field (e.g., the SMSGUID field).

Step 304 represents computing the key, e.g., by hashing some or all of the properties. In one example, this includes the Manufacturer property, the BrandID property, the PCache property, the NormSpeed property, the IsMobile property and the Name property. The key is saved in a field of the record. Note that in FIG. 2, the dashed line represents repeating this record-building process for as many computing devices as appropriate. Table lookups (described below) may occur in parallel with record building.

Step 306 represents performing the table lookup for a given record to find the date using the key. If an entry is found (step 308), the process branches to step 316 where the creation date is obtained and used in some way. For example, the date may be associated with the record, such as in another field, and/or used in conjunction with the machine identifier to generate a report that includes the age-related information of this machine.

If an entry is not found at step 308, the record can be added to an unknown list (step 312) for further research as described above. However, in one alternative aspect, dynamic table updating for new processors may be used, as represented by steps 310 and 314.

More particularly, the processor properties may be analyzed against rules or the like to determine whether the reason that the processor does not have an entry is that it is a newly developed processor not previously seen in the organization. For example, if a processor has a market name that is known to be a new type, and/or has a higher speed than others in the organization, is multi-core, has hyper-threading, and so forth, then it is likely relatively new. The current date of detection may be used as an estimate of the creation date, and the table updated with a new entry for this type of processor. More specific creation date data may be later obtained, however for now the dynamic table updating provides a reasonable date that avoids the need for further research, which otherwise may be needed for many records if a new batch of computers has just been installed on a network.

The lookup process may end, or may be repeated as appropriate for other computer systems until an inventory is complete, for example. At this time, a report may be generated from the records and associated dates, the records and/or associated dates may be persisted for later use, and so forth.

Exemplary Operating Environment

Figure 2:
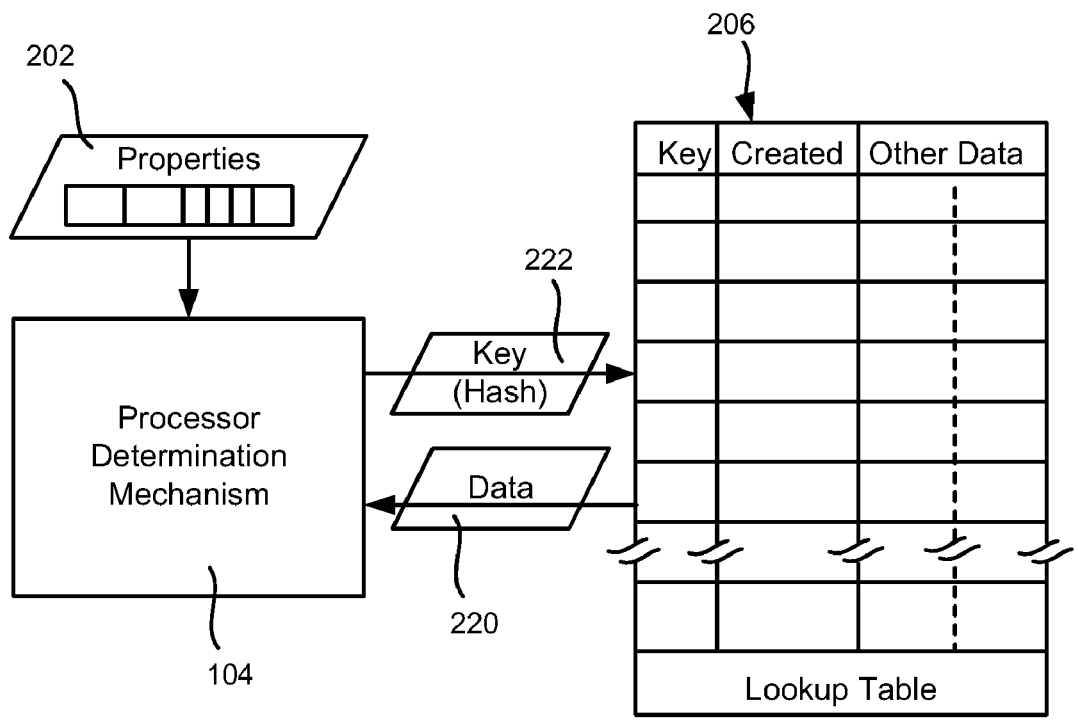
FIG. 2 is a block diagram representing an example table lookup to determine a processor's creation date and/or other information.
Figure 4:
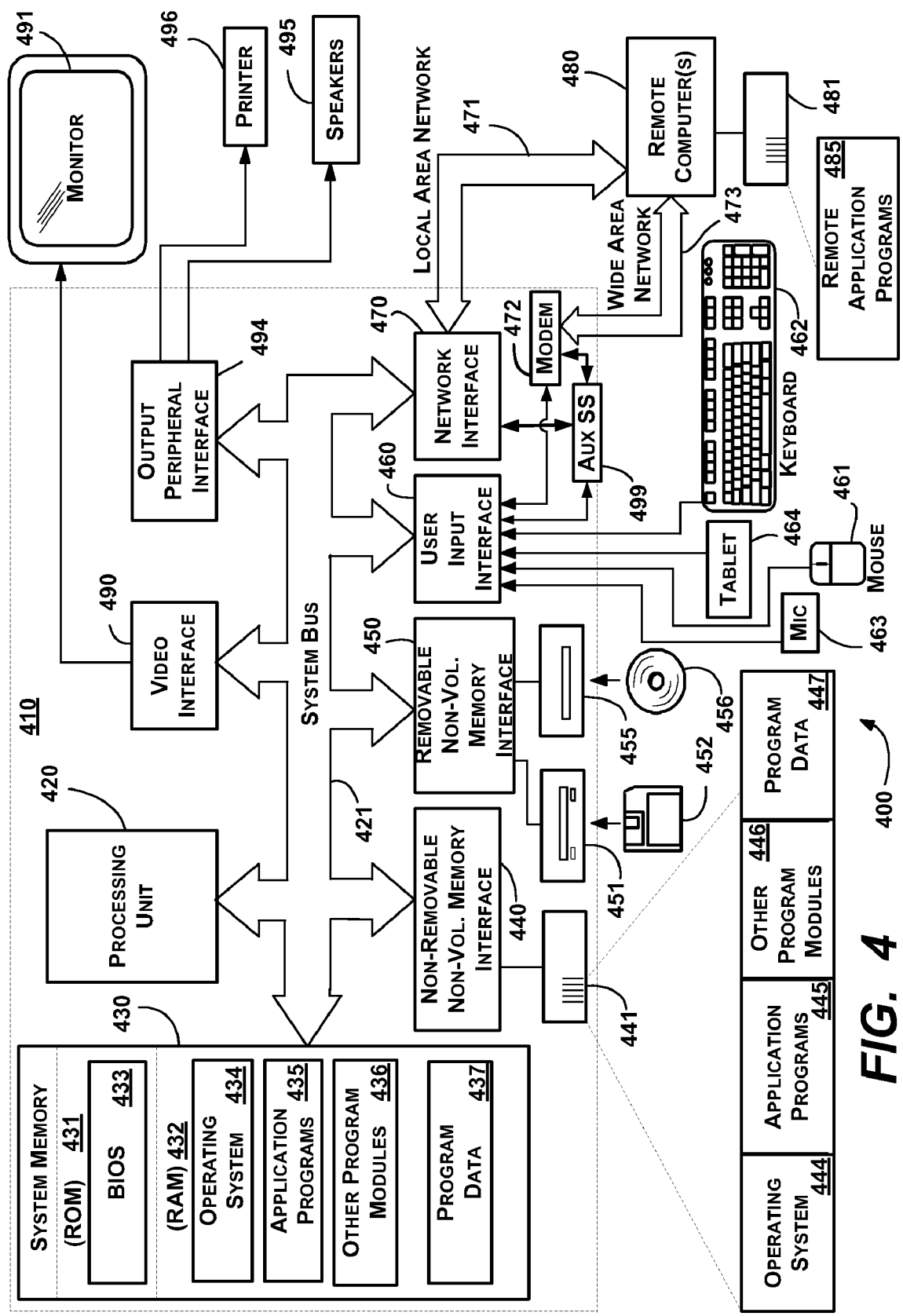
FIG. 4 shows an illustrative example of a computing environment into which various aspects of the present invention may be incorporated.

FIG. 4 illustrates an example of a suitable computing system environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment having a computer-based system, a method comprising, using a processing unit, collecting properties of a processor;

storing the collected properties in a data structure containing information related to the processor, wherein the data structure comprises information related to the processor includes creation date information that is indexed by a key determined from a combination of at least some of the properties, wherein the properties for a given processor include a hash value representative of at least two other properties, accessing the data structure based upon at least some of the properties to access other information with respect to the processor, wherein using data based upon the properties to access other information with respect to the processor comprises looking up a creation date based upon the properties, and associating the creation date with the processor, and, determining an approximate age of the computer-based system based upon the creation date of the processor.

2. The method of claim 1 wherein using the data based upon the properties to access other information comprises hashing at least some of the properties into a key for use in accessing a lookup table.

3. The method of claim 1 further comprising, normalizing at least one of the properties into part of the data that is based upon the properties.

4. The method of claim 1 wherein using the data based upon the properties to access other information comprises generating a key for use in accessing a lookup table, and further comprising, adding information with respect to the processor to an unknown list if the key does not have an entry in the table.

5. The method of claim 1 wherein using the data based upon the properties to access other information comprises generating a key for use in accessing a lookup table, and further comprising, determining whether the processor is likely a new processor if the key does not have an entry in the table, and if so, updating the lookup table with a new entry corresponding to this key.

6. The method of claim 2 further comprising, associating the key with the data based upon the properties.

7. In a computing environment, a system comprising:

a computer comprising a processing unit, the computer further comprising:

a data structure containing information related to a processor, wherein the data structure comprises information related to the processor includes creation date information that is indexed by a key determined from a combination of at least some of the properties; and a processor determination mechanism coupled to the data structure, the processor determination mechanism configured to collect properties for a given processor, and to access the data structure based on at least some of those properties to obtain at least some of the information related to that given processor, wherein the properties for the given processor include a hash value representative of at least two other properties.

8. The system of claim 7 wherein the data structure comprises a lookup table.

9. The system of claim 7 wherein the data structure information related to the processor includes processor creation date information, processor recall information, processor compatibility information, or processor clocking information, or any combination of processor creation date information, processor recall information, processor compatibility information, or processor clocking information.

10. The system of claim 7 wherein the properties for the given processor include a property related to a manufacturer of the processor, a property related to a brand identifier for the processor, a property related to processor cache information, a property related to normalized processor speed data, a property related to mobile chip data or a property related to a name of a CPU model, or any combination of properties related to a manufacturer of the processor, a brand identifier for the processor, processor cache information, normalized processor speed data, mobile chip data or a name of the CPU model.

11. The system of claim 7 wherein the properties for the given processor include an identifier that identifies the processor relative to other processors of other computing devices in the computing environment.

12. One or more computer-readable storage media having stored thereon computer-executable instructions that perform acts comprising:

using a processing unit, collecting properties of a processor;

storing the collected properties in a data structure containing information related to the processor, wherein the data structure comprises information related to the processor includes creation date information that is indexed by a key determined from a combination of at least some of the properties, wherein the properties for a given processor include a hash value representative of at least two other properties, accessing the data structure based upon at least some of the properties to access other information with respect to the processor, wherein using data based upon the properties to access other information with respect to the processor comprises looking up a creation date based upon the properties, and associating the creation date with the processor, and, determining an approximate age of the computer-based system based upon the creation date of the processor.

13. The one or more computer-readable storage media of claim 12 wherein the key value comprises a hash of data from at least two fields containing the data representative of the properties of the processor.

14. The one or more computer-readable storage media of claim 12 wherein when accessed, the information with respect to the processor is maintained in another field of the data structure.

15. The one or more computer-readable storage media of claim 12 wherein the set of fields include data related to a manufacturer of the processor, data related to a brand identifier for the processor, data related to processor cache information, data related to normalized processor speed data, data related to mobile chip information or data related to a name of a CPU model, or any combination of a manufacturer of the processor, a brand identifier for the processor, processor cache information, normalized processor speed data, mobile chip data or a name of the CPU model.

* * * * *